United States Patent
Jachmann

(10) Patent No.: US 11,573,308 B2
(45) Date of Patent: Feb. 7, 2023

(54) METHOD OF OPERATING A DISTANCE-MEASURING MONITORING SENSOR AND DISTANCE MEASURING MONITORING SENSOR

(71) Applicant: SICK AG, Waldkirch/Breisgau (DE)

(72) Inventor: Fabian Jachmann, Freiburg (DE)

(73) Assignee: SICK AG, Waldkirch/Breisgau (DE)

(*) Notice: Subject to any disclaimer, the term of this patent is extended or adjusted under 35 U.S.C. 154(b) by 408 days.

(21) Appl. No.: 16/828,469

(22) Filed: Mar. 24, 2020

(65) Prior Publication Data

US 2020/0309924 A1 Oct. 1, 2020

(30) Foreign Application Priority Data

Mar. 26, 2019 (DE) .......................... 102019107681.1

(51) Int. Cl.
  *G01S 7/497* (2006.01)
  *G01S 17/10* (2020.01)
  *G01S 7/481* (2006.01)
(52) U.S. Cl.
  CPC ............ *G01S 7/497* (2013.01); *G01S 7/4817* (2013.01); *G01S 17/10* (2013.01)
(58) Field of Classification Search
  CPC ...... G01S 7/4817; G01S 7/4865; G01S 7/487; G01S 7/497; G01S 17/06; G01S 17/10; G01S 17/88; G01S 17/931
  USPC ....................................................... 702/149
  See application file for complete search history.

(56) References Cited

U.S. PATENT DOCUMENTS

| 7,760,336 B2 | 7/2010 | Iwasawa |
| 8,724,096 B2* | 5/2014 | Gosch ..................... G01S 7/483 356/3.01 |
| 2009/0086189 A1 | 4/2009 | Drinkard |
| 2019/0056504 A1 | 2/2019 | Hartman et al. |

(Continued)

FOREIGN PATENT DOCUMENTS

| CN | 1770211 A | 5/2006 |
| CN | 101034155 A | 9/2007 |
| CN | 101449181 A | 6/2009 |

(Continued)

OTHER PUBLICATIONS

European Search Report dated Aug. 24, 2020, for corresponding application 20162297.4.

(Continued)

*Primary Examiner* — John H Le
(74) *Attorney, Agent, or Firm* — Nath, Goldberg & Meyer; Jerald L. Meyer; Morgan D. Rosenberg

(57) ABSTRACT

A method of operating a monitoring sensor comprising a light transmitter; a light receiver; and a deflection unit is described, with the method comprising the steps:
a) detecting a respective detected signal that comprises a time curve of a reception signal received for an angle of rotation;
b) determining the number of reception light pulses in the detected signal;
c) generating a detection signal that comprises information on the determined position of an object, wherein checks are made in accordance with first, second and third test conditions, and with the first test condition being checked in a first test step, and one of the second and third test conditions being checked in possibly performed second and/or third test steps respectively.

9 Claims, 3 Drawing Sheets

(56) References Cited

U.S. PATENT DOCUMENTS

Figure 1:
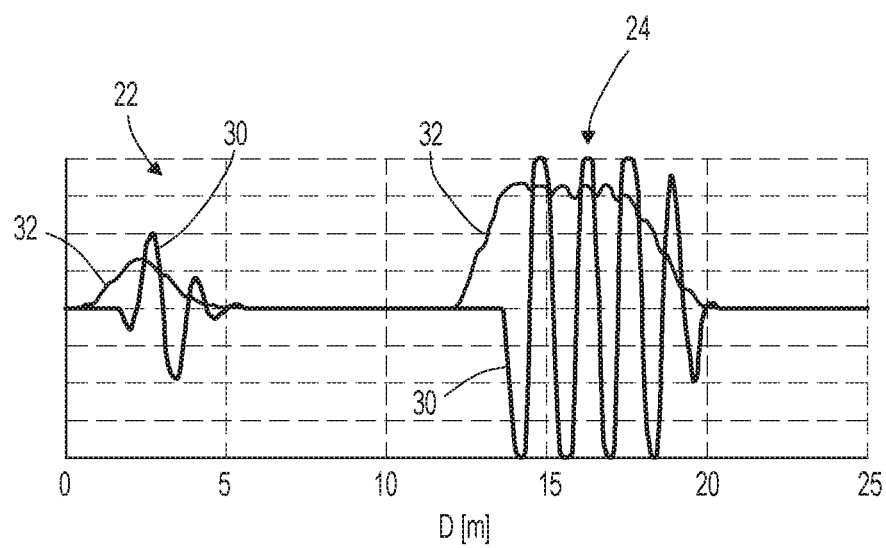

2019/0064329 A1    2/2019  Liu et al.
2020/0150243 A1*  5/2020  Di Chele .............. G01S 7/4817

FOREIGN PATENT DOCUMENTS

| | | |
|---|---|---|
| CN | 105445748 A | 3/2016 |
| DE | 102012112987 B3 | 12/2013 |
| EP | 2899705 A1 | 7/2015 |
| JP | 2011505545 A | 2/2011 |
| JP | 2011164082 A | 8/2011 |

OTHER PUBLICATIONS

German Office Action dated Feb. 10, 2020 corresponding to application No. 102019107681.1.
Office Action dated Jul. 8, 2022 for application No. CN202010213639.3.
Office action dated Mar. 30, 2021, in counterpart JP 2020-043609.

* cited by examiner

METHOD OF OPERATING A DISTANCE-MEASURING MONITORING SENSOR AND DISTANCE MEASURING MONITORING SENSOR

The present invention relates to a method of operating a distance-measuring monitoring sensor for the detection and position determination of objects in an at least two-dimensional protected field, wherein the monitoring sensor comprises at least one light transmitter that is configured to transmit light pulses into the protected field; at least one light receiver that is configured to receive light pulses as reception light pulses that are reflected or remitted by at least one object possibly present in the protected field; and a deflection unit that is configured to periodically scan at least the protected field with the transmitted light pulses, wherein the respective position of the at least one object can be determined from an angle of rotation of the deflection unit and from the distance determined in dependence on the time of flight of a respective reception light pulse.

Such a distance-measuring monitoring sensor is also called a scanner and can be configured as a laser scanner, for example. A transmission light pulse generated by the light transmitter, e.g. by a laser or the like, is directed via the deflection unit into the protected field to be monitored and is reflected or remitted there by a possibly present object. The reflected or remitted light moves back to the monitoring sensor again and is detected by the light receiver there. The deflection unit is usually designed as pivotable or rotatable such that a respective light pulse generated by the light transmitter sweeps over a portion of the protected field corresponding to the pivot movement or rotation movement. The deflection unit can in particular comprise mirrors and/or optics with whose aid the transmitted light pulses and possibly also the received light pulses are diverted or deflected in a desired direction, wherein the direction in which a respective light pulse is transmitted and from which an associated reception light pulse is possibly received is determined by the current angular position or the current angle of rotation. If the light receiver receives one or more reception light pulses as a respective reception signal associated with a specific transmission light pulse from the protected field, a conclusion can be drawn on the angular position of the object in the protected field from the current angular position or from the current angle of rotation of the deflection unit. As a rule, a light pulse is transmitted and an associated reception signal is received at each angle of rotation, with a plurality of light pulses, however, generally also being able to be transmitted per angle of rotation. The protected field is thus scanned in accordance with a sequence of discrete angles of rotation. The distance of the object from the monitoring sensor can be determined on the basis of the time of flight of a light pulse, i.e. on the duration of time between the transmission of the light pulse and the reception of the associated reception light pulse by the light receiver. The position of a respective object can then be determined from the angular position and the associated distance.

The monitoring sensor can thus so-to-say generate an "image" of the monitored protected field.

With the aid of a further evaluation of the detected reception light pulses, it can in particular be determined whether an unauthorized object is present within the protected field.

Thus, monitoring sensors of the category are, for example, used with stationary or moving machines or vehicles in which a danger zone has to be monitored for safety reasons that may not be infringed by persons or by objects in the operation of the machine or vehicle. If the presence of an unauthorized object, for example a limb of an operator, in the danger zone is determined by the monitoring sensor, an object detection signal can be output by the monitoring sensor that can, for example, effect a shutdown of the machine, a stopping of the vehicle or the like.

However, small particles such as dust penetrating into the protected field, chips flying around, raindrops or snowflakes can result in an unnecessary or unwanted shutdown of the machine or a stopping of the vehicle. Such false positive object detection signals reduce the availability of the machine or of the vehicle.

To avoid this disadvantage, the concept of the so-called multiple evaluation can be used, for example. This concept provides that a respective two or more consecutive scanning cycles of the protected field are observed, with an object having to be detected at the same point or within a defined environment in each of these scanning cycles in order to trigger an object detection signal. It is assumed in this respect that those objects that could trigger a false positive object detection signal move relatively fast and are therefore only detected in some of the scanning cycles observed and/or in all the scanning cycles, but at positions very far away from one another.

The robustness of the sensor with respect to interference based on small occluding objects or particles such as insects, raindrops, material chips or snowflakes is indeed increased by such a multiple evaluation so that the availability of a machine monitored by the sensor is increased. The response time of the sensor, however, also increases with the number of scanning cycles to be evaluated since a multiple scanning requires correspondingly more time. However, an increased response time can, for example, require the working speed of the monitored machine to be reduced since it has to be ensured, for example, that a safe stopping has taken place before the object (that is, for example, an endangered person) has approached the machine or the machine (for example, a driverless transport system) has approached an endangered person.

In a different solution approach, the fact is utilized that a plurality of reception light pulses incident shortly after one another can also be received for a respective transmitted light pulse when occluding particles are present, which is due to the fact that a transmitted light pulse is first incident on a small object that only remits a portion of the light pulse, wherein the non-remitted portion of the light pulse can possibly be incident on a further object located at a greater distance from the monitoring sensor and is likewise remitted by said further object. The monitoring sensor therefore receives two or even more reception light pulses for a specific angle of rotation. A certain distance can be associated with each of these reception light pulses.

In a method described in EP 2 899 705 B1 that is based on the above-mentioned solution approach, the reception light pulses are evaluated such that a relative distance between the reflection locations of the associated reception light pulses is determined. The distance difference is then compared with a predefined distance value. If the distance difference is greater than or equal to the predetermined distance value, the distance data are buffered in a first memory, otherwise in a second temporary memory. A statistical evaluation of the two temporary buffers subsequently takes place, wherein a decision is made in dependence on specific criteria whether an object detection signal is generated on the basis of the distance data stored in the first buffer or in the second buffer.

It is the object of the invention to provide a method of the initially mentioned kind in which, to avoid the generation of false positive object detection signals, criteria are examined that enable a decision to be made whether a detected object is to be considered as safety-critical or as non-critical.

The object is satisfied by a method having the features of defined in the independent claim. The method in accordance with the invention comprises the steps:
a) detecting a respective detected signal that comprises a respective time curve of a reception signal received by the light receiver for a respective angle of rotation;
b) determining the number of reception light pulses that are included in a respective detected signal, with that reception light pulse which has the shortest time of flight representing a first reception light pulse and a possibly present reception light pulse which has a longer time of flight representing a second reception light pulse; and
c) generating a detection signal for a respective detected object, with the detection signal comprising information on the determined position of the object, wherein the method comprises at least the three following test conditions and the determination of the position and the determination of the distance take place in dependence on a respective logical truth value of at least one of the test conditions, wherein
   a check is made in accordance with a first test condition whether the number of reception light pulses in a respective reception signal is equal to 1;
   a check is made in accordance with a second test condition whether a comparison object, whose associated reception light pulse has the same or at least substantially (i.e. within the framework of the measurement accuracy of the monitoring sensor) the same time of flight as the first reception light pulse, was detected for at least one adjacent angle of rotation; and
   a check is made in accordance with a third test condition whether a reflector, whose associated reception light pulse has the same or at least substantially (i.e. within the framework of the measurement accuracy of the monitoring sensor) the same time of flight as the second reception light pulse, was detected for at least one adjacent angle of rotation,
   wherein the first test condition is checked in a first test step, either the second or third test condition is checked in a possibly performed second test step, and the third or second test condition that has not been checked up to then is checked in a possibly performed third test step, and wherein the determination of the distance takes place on the basis of the time of flight determined for the second reception light pulse if the truth value of the first, second and third test conditions is FALSE in each case and otherwise takes place on the basis of the time of flight determined for the first reception light pulse.

The fact is utilized in the method in accordance with the invention that the monitoring sensor can receive not only one reception light pulse, but also two or more reception light pulses or echoes for a respective angle of rotation in specific operating situations. For example, a first reception light pulse can be remitted by a particle that is not safety-critical, for example, a raindrop or a dust particle, whereas a second reception light pulse can be generated by a remission of the transmitted light pulse at a safety-critical object present in the protected field or also at a boundary of the protected field.

A time curve of the reception signal received by the light receiver for a respective angle of rotation is therefore recorded for a suitable period of time and is in particular at least temporarily stored to enable an evaluation of the detected signal. A separation of two reception light pulses is typically possible if the associated reflective or remitting objects are spaced apart from one another by more than approximately 1 to 3 m, wherein the exact resolution limit inter alia depends on the quality of the signal processing components used (e.g. the sampling rate). Since the deflection unit usually continues to rotate between the detection of a first reception light pulse and a second reception light pulse for a respective nominal angle of rotation, the actual angles of rotation for the two reception light pulses can differ very slightly from one another in accordance with the time of flight difference. However, as this time difference is in the order of magnitude of several nanoseconds, the angle of rotation change between the reception events for a respective nominal angle of rotation is negligible.

Different criteria are checked by said test conditions. When the first test condition is checked, a check is made whether the number of reception light pulses in a respective reception signal is equal to 1. If this is the case, the truth value of the first test condition is TRUE. If two or more reception light pulses were determined, the truth value of this statement is FALSE. Theoretically, the truth value would also be FALSE if no reception light pulses were detected for a specific angle of rotation. It is, however, assumed in this case that no object is present in the protected field or within the range of the monitoring sensor and therefore also no evaluation of a reception signal for determining an object distance is possible or no detected signal in a narrower sense is present. The method in accordance with the invention starts when it is clear from the presence of at least one reflected or remitted reception light pulse that an object is in the protected field and serves for the distance determination of such an object. As long as no reception light pulse is received, it can be assumed that no object whose distance is to be determined is present in the monitored protected field.

A check is made with the second test condition whether a comparison object, whose associated reception light pulse has substantially the same time of flight as the first reception light pulse, was detected for at least one adjacent angle of rotation. With this check, a determination is made whether a scenario is present that is also called edge impact. It is, for example, conceivable that a light pulse that has a certain cross-section brushes an object in the edge region. In this case, a portion of the transmitted light pulse is remitted by the object impacted at its edge and is registered as the first reception light pulse. The non-remitted portion of the light pulse can possibly still be remitted by a further object and can be registered as the second reception light pulse. In this case, it must be prevented that the distance takes place on the basis of the time of flight determined for the second reception light pulse since it cannot be precluded that the object impacted in a brushing manner or at its edge is a safety-critical object and not a non-critical particle.

On the check of the third test condition, according to which it is checked whether a reflector was detected, a determination is made whether a further potentially safety-critical scenario is present. It is thus conceivable that the transmitted light pulse is first incident on a possibly safety-critical object that remits a large portion of the intensity of the light pulse as the first reception light pulse, with, however, a small portion of the transmitted light pulse being able to pass through this object in the form of scattered light, for example. The intensity of the scattered light typically only amounts to approximately 0.1-1% of the intensity in the spot of a laser beam. If this passing scattered light is incident on a reflector, in particular on a retroreflector, it can be registered as the second reception light pulse that can, in dependence on the geometric conditions and the respective surface properties of the detected objects, have an intensity that is by all means comparable or even higher than the first reception light pulse. Retroreflectors in particular have to be considered as critical here since they reflect approximately the total light intensity in a directed manner. The degree of remission of a retroreflector can be higher by a factor of up to 10,000 or 100,000 than the degree of remission of a black object. Thus it is, for example, conceivable that a large portion of the transmitted light pulse is indeed incident on a potentially safety-critical object, wherein the first reception light pulse thereby generated can nevertheless have a comparatively low intensity if this object only remits a small portion of this intensity due to a low degree of remission and the first and second reception light pulses therefore have comparable intensities. Such a reflector, in particular a retroreflector, can be located in the beam path by chance or can, for example, be deliberately provided for reasons of the measurement arrangement provided for monitoring.

Only if the respective truth value is FALSE for all three said test conditions, will the distance be determined on the basis of the time of flight determined for the second reception light pulse. The first reception light pulse will then be discarded as a rule, i.e. it will not be used for a distance determination, since it can then be assumed with a very high probability that the first reception light pulse is due to an occluding object, i.e. a non-critical particle such as dust, a raindrop or a snowflake. As soon as at least one of said test conditions therefore has the truth value TRUE, there is generally the possibility that the first reception light pulse can also originate from a potentially safety-critical object. In this case, it is not permitted to determine the distance on the basis of the time of flight of the second reception light pulse since, in the worst case, a false negative object detection signal could otherwise be generated, i.e. an at least potentially safety-critical object in the protected field would incorrectly not be recognized as such.

On the check of the second and third test conditions whether an edge impact is present or a (retro)reflector was impacted, the focus is on a comparison of the reception signal to be evaluated at the current angle of rotation with one or more adjacent angles of rotation. The adjacent angles of rotation can be those angles of rotation that are sampled or evaluated before in time or after in time with respect to the current angle of rotation to be considered. This comparative evaluation of adjacent angles of rotation also does not have to be restricted to the directly adjacent angles of rotation, but can rather also include a plurality of angles of rotation, for example the two, three or four closest angles of rotation. Adjacent angles of rotation are in particular understood as successive angles of rotation in the initially mentioned sequence of angles of rotation, i.e. as a rule those angles of rotation that do not differ from the current angle of rotation by more than a specific angle of rotation difference. If a comparison is to be made with angles of rotation determined after one another in time, the performance of the test steps for the current angle of rotation can be suspended, if necessary, until the corresponding results for the adjacent angles of rotation are present.

On the check for the presence of an edge impact, it is assumed that an object that is only impacted in a brushing manner at the current angle of rotation is at least substantially completely impacted by the transmitted light pulse at an adjacent angle of rotation. In the detected signal of this adjacent angle of rotation, a reception light pulse is thus usually present whose distance is substantially, i.e. within the framework of the measurement accuracy of the monitoring sensor, equal to the distance determined for the first reception light pulse in question of the detected signal for the current angle of rotation.

The same procedure can be followed in a corresponding manner on the check of the third test condition. One or more adjacent angles of rotation are also considered again here. If, at an adjacent angle of rotation, a reflector was impacted for which the same distance was determined as for the second reception light pulse in question of the current angle of rotation, it is assumed that the second reception light pulse of the current angle of rotation is likewise due to a reflection at the reflector. In this case, it has to be ensured that the distance is determined here on the basis of the time of flight of the first reception light pulse since the latter can originate from an at least potentially safety-critical object. An evaluation of the intensities in the corresponding detected signals can, for example, be used for the recognition of reflectors at the adjacent angles of rotation, which will be explained in more detail in the following.

The danger that a false positive object detection signal is generated due to the presence of occluding objects not critical to safety, such as dust particles, chips, raindrops or snowflakes, can thus be substantially reduced by the method in accordance with the invention without the safety on the monitoring of a potentially dangerous machine or of a vehicle thereby being impaired. Before a detected signal or a reception light pulse is discarded regarding which it can be assumed that it originates from an object not critical to safety, a plurality of scenarios have to be able to be precluded in which the presence of two or more reception light pulses in a detected signal for a respective angle of rotation could also be due to potentially safety-critical situations.

Those objects or particles are designated as "occluding" here that are indeed responsible for a further reception light pulse in the respective reception light signal, but are not inherently non-critical with respect to safety, wherein accumulations of such objects (that is e.g. dust clouds) should also be covered by this designation.

In addition to said steps, the method can also comprise further steps that are carried out before, between, and/or during the steps in accordance with the invention. A further evaluation of the detected signals and/or detection signals with which one or more additional test conditions are checked can in particular be carried out. These test conditions can, for example, comprise an evaluation of the intensity or signal level of the reception light pulses. Furthermore, conditions can also be checked on the basis of which a decision is made whether an object detection signal and/or an alarm signal is to be output.

In general, individual test conditions, in particular the first test condition, can also be checked a multiple of times. This will be explained in more detail in the following in the description of an embodiment.

The test steps can in particular be considered as sub-steps of step c) and are preferably performed one after the other in the sequence mentioned, wherein the test sequence of the second and third test conditions can in particular also be swapped.

The method in accordance with the invention should in this respect also comprise method versions in which test conditions are checked that are generally identical to the test conditions described and are only worded differently. Such generally identical test conditions are, for example, test conditions worded in a logically complementary manner, i.e.

statements to be checked that are e.g. reworded by negation, including correspondingly adapted (e.g. swapped) truth values, on whose application to a specific detected signal the same result is obtained as on the application of the explicitly described test conditions to this detected signal.

In accordance with an advantageous embodiment of the method, further ones of the three test conditions are no longer checked if the truth value of a previously checked test condition is TRUE. As soon as one of the test conditions has the truth value TRUE, the performance of at least said three test steps can be terminated. Only if the first test condition is FALSE, will the second (or third) test condition be checked. Only if this test condition is also FALSE, will the not yet checked third (or second) test condition be checked.

Alternatively, provision can be made that the first, second and third test steps are first carried out and the truth values of the associated test conditions are evaluated in a subsequent evaluation step, with a determination being made on the basis of said conditions for the truth values whether the distance is to be determined on the basis of the time of flight of the first or second reception light pulse. In other words, in such an embodiment of the method in accordance with the invention, all three said test conditions are always checked and the respective truth values are only subsequently evaluated to decide whether the distance has to be determined on the basis of the time of flight of the first or second reception light pulse. In this variant, a flag can, for example, be set for each test condition that represents the truth value for each of the three test conditions. These flags can, for example, be buffered together with the detected signal or reception signal. Only if all three flags represent the truth value FALSE, will the determination of the distance take place on the basis of the time of flight determined for the second reception light pulse. If one or more of the flags have a truth value TRUE, the distance determination always takes place on the basis of the time of flight determined for the first reception light pulse.

In accordance with an advantageous embodiment, step a) can comprise a quantization of the detected signal. The detected signal is therefore sampled at a specific frequency and is then digitized if necessary. A so-called FPGA (field programmable gate array) can, for example, be used for this step.

An alarm signal or a shutdown signal can advantageously be output in a step d) following step c) if at least one respective detection signal satisfies at least one predefined alarm condition. This alarm signal or shutdown signal can also be considered as an object detection signal. Said at least one predefined alarm condition can, for example, be an additional condition that makes it possible to identify safety-critical objects. For example, a determination can be made whether an object having a specific (minimum) size—that can be determined by evaluating a plurality of adjacent angles of rotation—was detected at a specific distance and/or at a specific angle of rotation.

In accordance with a further advantageous embodiment, the determination of the number of reception light pulses in step b) comprises a determination being made for one or more local maxima present in the detected signal whether one or more criteria are satisfied that are necessary for an identification as a reception light pulse, with the criteria being selected from a group that comprises a predefined height, width and/or pulse shape. A signal processing of the reception signal that can, for example, comprise a demodulation and/or a filtering can primarily also take place before the number of reception light pulses is determined.

The check of the third test condition (whether a reflector was detected for an adjacent angle of rotation) advantageously comprises the intensity of a reception light pulse associated with the at least one adjacent angle of rotation being evaluated and preferably being compared with a fixedly or dynamically predefined intensity threshold value. This embodiment is based on the recognition that reflectors, in particular retroreflectors, have a much higher reflectivity or remissivity than objects typically to be expected that usually absorb or diffusely scatter a portion of the incident light intensity so that said portion can no longer reach the light receiver. The ratio of these intensities can by all means amount to up to 1:10,000. A fixed intensity threshold value can, for example, be predefined in a preceding learning process or by a suitable parameterization. A dynamic specification of the intensity threshold value can, for example, take place by a comparison with a plurality of other reception light pulses with respect to which it can be assumed that they do not originate from a reflector.

In accordance with a further advantageous embodiment of the invention, the monitoring sensor is a laser scanner that is adapted to monitor one or more scanning surfaces. The protected field extends within a scanning surface and can, for example, be sector-shaped (at a scanning angle of less than 360°) or circular (scanning angle equal to 360°). A three-dimensional protected field can be scanned by a laser scanner that has a plurality of scanning surfaces. The scanning surfaces can extend in a plurality of parallel, mutually spaced apart planes or can be designed as conical scanning surfaces having conical angles, in particular different conical angles.

The present invention further relates to a distance-measuring monitoring sensor having the features of the independent apparatus claim. A distance monitoring sensor in accordance with the invention for the detection and position determination of objects in an at least two-dimensional protected field comprises at least one light transmitter; at least one light receiver; a deflection unit; and a control unit, with the control unit being adapted to carry out the method in accordance with at least one of the preceding embodiments in accordance with the invention or advantageous embodiments. Since the control unit can also carry out different evaluation steps in addition to controlling the components of the monitoring sensor, it can also be designated as a control and evaluation unit. The control unit is thus in particular also configured to detect the detected signal, to determine the number of reception light pulses in a respective reception light signal, to generate a detection signal, to check at least the three said test conditions and to determine the distance on the basis of the time of flight determined for a respective reception light pulse. In general, the control unit is configured such that it can check all three test conditions even if one or more of said test conditions may no longer need to be checked solely for the reason that an already previously checked test condition allows a decision to be made whether the determination of the distance should take place on the basis of the time of flight of the first or second reception light pulse.

Further advantageous embodiments of the invention result from the dependent claims, the description and the drawings, wherein advantageous embodiments described with respect to the method in accordance with the invention also relate to the monitoring sensor in accordance with the invention and vice versa. Advantageous embodiments can in particular also be combined through combinations not explicitly mentioned here to form further advantageous embodiments.

Figure 2:
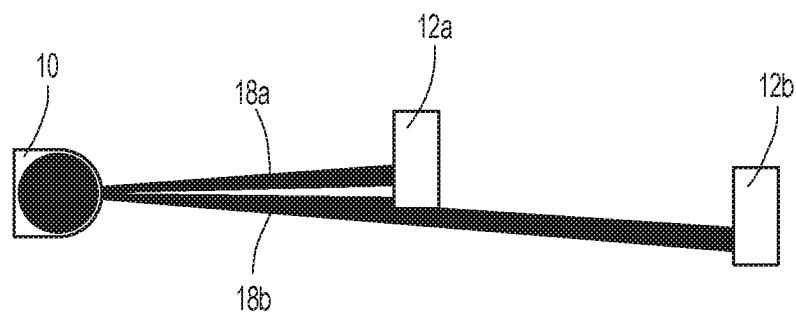
Figure 3:
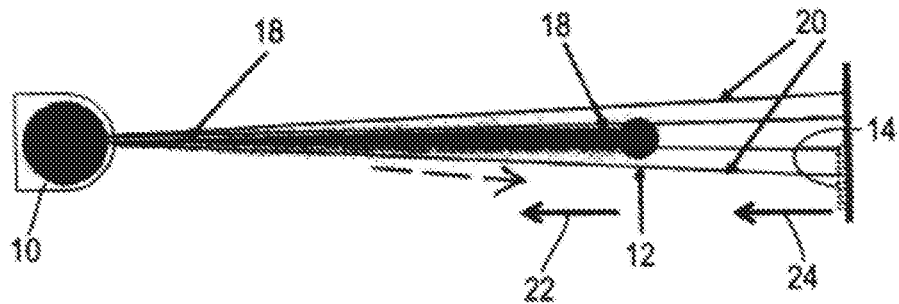
Figure 4:
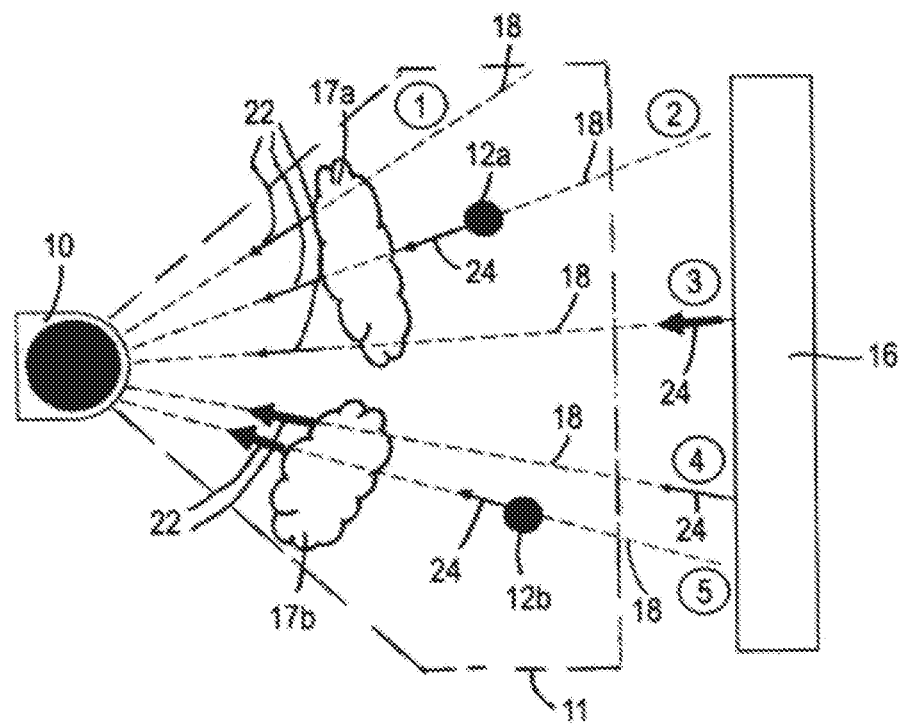

The invention will be described in the following with reference to an embodiment and to the drawings. There are shown:

FIG. 1 a diagram of a detected signal detected by a distance-measuring monitoring sensor;

FIG. 2 a schematic representation of a detection scenario in which an edge impact is present;

FIG. 3 a schematic representation of a further detection scenario in which a reflector was detected in addition to an object;

FIG. 4 a schematic representation of five different detection scenarios; and

Figure 5:
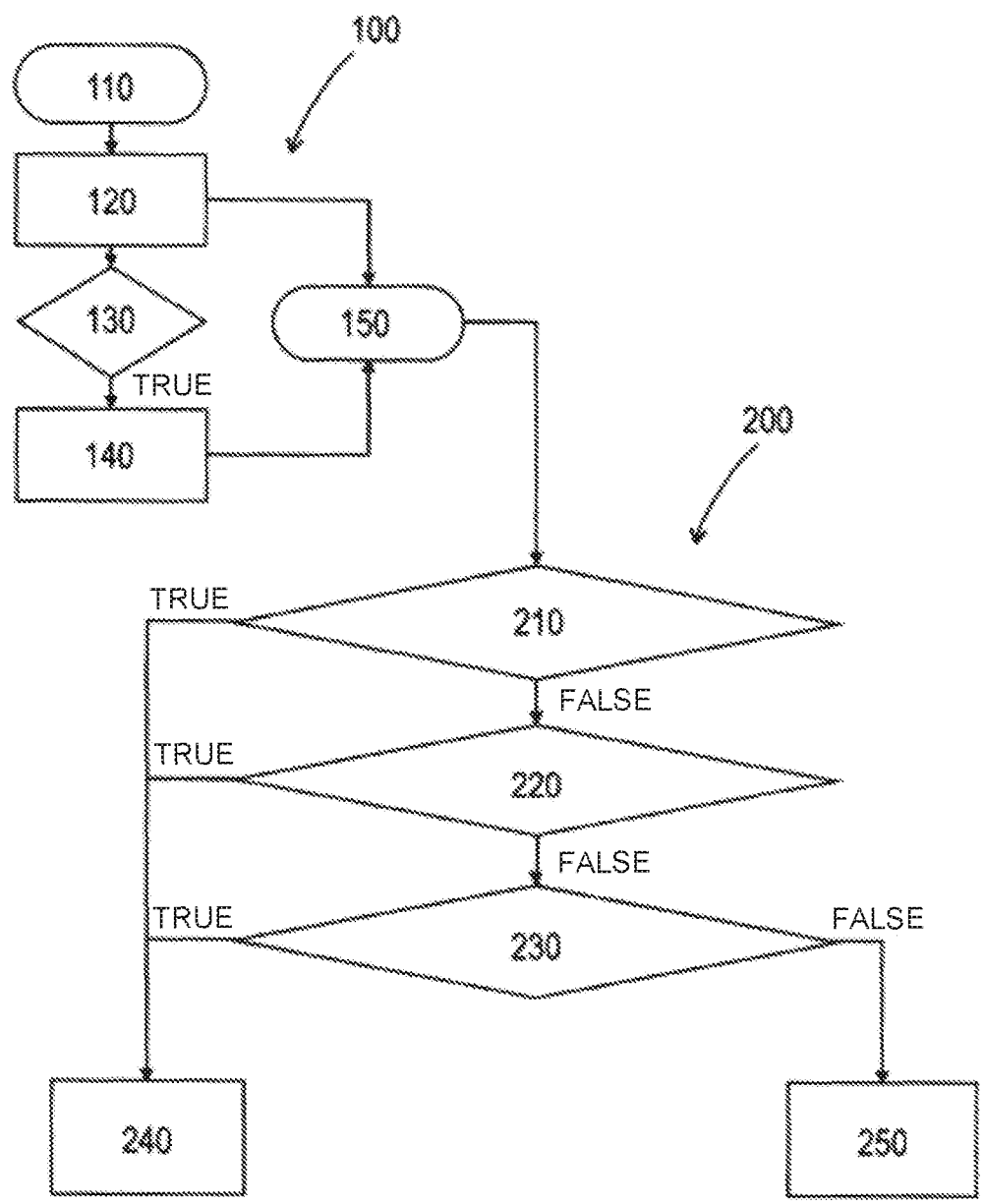

FIG. 5 a flowchart of the method in accordance with an embodiment of the invention.

FIG. 1 shows a diagram of a detected signal that represents a time curve of a reception signal received for a respective angle of rotation by a light receiver of a distance-measuring monitoring sensor. The time of flight was converted to a distance D that is entered on the x axis of the diagram. The y axis of the diagram represents the intensity in arbitrary units.

The diagram of FIG. 1 comprises a raw detected signal 30, on the one hand, such as is present after sampling the reception signal, for example. The other curve represents a detected signal 32 that was generated by demodulation of the raw detected signal 30. The raw detected signal 30 or the detected signal 32 has two different reception light pulses 22, 24, wherein the smaller reception light pulse that is detected first in time (i.e. at a smaller interval) represents a first reception light pulse 22 and the larger reception light pulse that is detected subsequently in time (i.e. at a larger interval) represents a second reception light pulse 24.

The detected signal 30, 32 shown in FIG. 1 in particular represents a scenario in which a light pulse transmitted by a light transmitter of a monitoring sensor is first incident on an occluding object, for example a dust cloud or a veil of mist, that remits a portion of the transmitted light pulse in the direction of the monitoring sensor. This remitted light portion corresponds to the first reception light pulse 22. The remaining portion of the transmitted light is incident at a greater distance on a larger object, for example a safety-critical object, for instance a body part of an operator of a machine monitored by the monitoring sensor. This portion of the remitted light pulse corresponds to the second reception light pulse 24.

In accordance with the method in accordance with the invention, a check is now made in accordance with a first test condition whether the number of reception light pulses present in the detected signal is equal to 1. If this condition is TRUE, the position of an object that has remitted the respective reception light pulse is determined on the basis of the current angle of rotation of the deflection unit and on the basis of the time of flight of the respective reception light pulse. A further check of additional test conditions is not necessary since only one object was detected. However, if the detected signal has two (or more) reception light pulses as shown in FIG. 1, the truth value of the first test condition is FALSE.

One or more further test conditions that represent different scenarios have to be checked before a decision can be made whether the distance for the current angle of rotation is determined on the basis of the first reception light pulse 22 or of the second reception light pulse 24.

A first exemplary scenario is schematically shown in FIG. 2. Two transmitted light pulses 18a, 18b are shown there that were transmitted by a light transmitter of a distance-measuring monitoring sensor 10. Whereas the light pulse 18a is solely incident on an object 12a disposed closer to the monitoring sensor 10, the adjacent light pulse 18b is incident on both the object 12a and an object 12b that is disposed behind it and that is remote from the monitoring sensor 10. A detected signal associated with the light pulse 18b could approximately correspond to the detected signal of FIG. 1. Accordingly, it could not be seen from the detected signal itself whether the first reception light pulse 22 originates from a non-critical occluding object or from a possibly safety-critical object 12a in accordance with FIG. 2 on which a portion of the light pulse 18b was incident in the region of an edge.

To be able to make a differentiation here, a check is made in accordance with a second test condition whether a comparison object, whose associated reception light pulse has substantially the same time of flight as the first reception light pulse, was detected for at least one adjacent angle of rotation. In the example of FIG. 2, the time of flight for the light pulse 18a completely remitted at the object 12a would be evaluated accordingly. Since both light pulses 18a, 18b are incident on the same object 12a, this check results in a truth value TRUE for the second test condition applied to the light pulse 18b in the case shown. Accordingly, the determination of the distance for the current angle of rotation (corresponding to the light pulse 18b) has to take place on the basis of the time of flight determined for the first reception light pulse. It is thus precluded that the object 12a is incorrectly treated as an occluding object not critical to safety and is not taken into account in the distance determination.

For the case that no edge impact of this kind was detected, a second exemplary scenario also has to be checked that is represented in the schematic representation of FIG. 3. FIG. 3 shows a light pulse 18 not to scale that has a high intensity at its core and that is surrounded by a conical jacket of scattered light 20 that has a substantially lower intensity. In the scenario of FIG. 3, the light pulse 18 is almost completely incident on an object 12 and is remitted there as the first reception light pulse 22 in the direction of the monitoring sensor 10. However, the scattered light 20 can pass the object 12 and is partly incident on a reflector 14, in particular a retroreflector, that is located behind the object 12 viewed from the monitoring sensor 10. The reflected scattered light generates a second reception light pulse 24. In this scenario, the detected signal is also similar to the detected signal shown in FIG. 1, wherein the intensity ratios of the two reception light pulses 22, 24 may differ.

In accordance with a third test condition, a check must therefore be made whether a reflector, whose associated reception light pulse has substantially the same time of flight as the second reception light pulse 24, was detected for at least one adjacent angle of rotation. In the scenario shown in FIG. 3, a corresponding light pulse will be substantially completely incident on the reflector for a corresponding adjacent angle of rotation that is represented by a dashed arrow. The corresponding reception light pulse has the same time of flight and accordingly also the same associated distance as the second reception light pulse 24. Since this reception light pulse has a very high intensity due to the reflection at a (retro)reflector, it can additionally be determined by comparing the intensity with a reference value that this reception light pulse has to originate from a (retro)reflector. Consequently, the considered second reception light pulse 24 then also has to originate from the (retro) reflector. Accordingly, the truth value TRUE can be associated with the third test condition for the scenario presented here. As a result, the distance determination here also has to take place on the basis of the time of flight determined for the first reception light pulse, i.e. the determined distance for the currently considered angle of rotation corresponds to the distance of the object 12 from the monitoring sensor 10.

In FIG. 4, a total of five different detection scenarios are again shown by way of example in combined form and are marked by numbers from 1 to 5.

A protected field 11 monitored by a monitoring sensor 10 is shown with a dashed boundary line. A background object 16 is located behind the protected field 11. This background object 16 can, for example, represent a stationary component of a machine to be monitored or a wall. On the one hand, occluding objects 17a, 17b shown as clouds, for example dust clouds, are located within the protected field 11 and comprise objects or particles that are not critical to safety. Two safety-critical objects 12a, 12b are located behind the occluding objects 17a, 17b viewed from the monitoring sensor 10. The reception light pulses 22, 24 generated by the objects 12a, 12b, 16, 17a, 17b are represented by respective arrows, wherein the intensity of the reception light pulses 22, 24 is represented by the line width of the arrows (the thicker an arrow, the higher the intensity).

In scenario 1, a transmitted light pulse 18 is only incident on the occluding object 17a such that the correspondingly generated detected signal has only one single reception light pulse 22. Since this location is within the protected field 11, a protected field infringement is output as an alarm signal.

In scenario 2, the transmitted light pulse 18 is first incident on the occluding object 17a that remits a portion of the light pulse 18 as the first reception light pulse 22 and transmits another portion of the light pulse 18 that is remitted by the object 12a as the second reception light pulse 24. Since neither an object edge nor a reflector was impacted and since the object 12a is located within the protected field 11, a protected field infringement is detected for the second reception light pulse 24.

In scenario 3, a relatively weak first reception light pulse 22 is detected by the occluding object 17a and a relatively strong second reception light pulse 24 is determined by the background object 16. However, since the background object 16 is located outside the protected field 11, no protected field infringement is determined.

In scenario 4, the occluding object 17b generates a relatively strong first reception light pulse 22 and the background object 16 generates a relatively weak second reception light pulse 24. Even though the occluding object 17b has a comparatively higher density and thus a lower transparency than the other occluding object 17a, this transparency is also recognized here and a distance determination takes place on the basis of the second reception light pulse. Since the latter in turn originates from the background object 16 and is thus disposed outside the protected field, the protected field is determined as free.

Finally, in scenario 5, the monitoring sensor 10 detects a relatively strong first reception light pulse 22 generated by the occluding object 17b and a very weak second reception light pulse 24 generated by the object 12b. Since the intensity of the second reception light pulse 24 is too low absolutely or relatively with respect to the first reception light pulse 22, a distance determination takes place here on the basis of the first reception light pulse 22. This has the result that a protected field infringement is determined by the occluding object 17b. This scenario takes account of the fact that the transparency of the occluding object 17b is so low that it no longer transmits sufficient intensity to ensure a reliable detection of an object 12b possibly disposed behind it.

Thus, the consideration of the absolute or relative intensities of the reception light pulses 22, 24 and the comparison of the distances determined for a respective object from the monitoring sensor 10 with predefined boundaries of the protected field 11 represent further respective test conditions that can be additionally checked within the framework of the method in accordance with the invention.

An exemplary routine of the method in accordance with the invention will now be explained in more detail with reference to FIG. 5 and to a flowchart.

The method comprises two method steps 100, 200 that are carried out after one another. In this respect, the method described starts when at least one reception light pulse is present in the reception signal at a specific angle of rotation and in this respect an object in the protected field whose distance is to be determined can be assumed.

In a step 110 of the method section 100, a detected signal is provided in sampled form that represents a respective time curve of a reception signal received by the light receiver for a respective angle of rotation.

In a next step 120, the time of flight or the corresponding distance for a first reception light pulse of the detected signal is determined and is supplied to a measurement data set 150.

In a further step 130, a check is made whether the detected signal has a second reception light pulse. If this test condition is TRUE, the time of flight or the associated distance of the second reception light pulse is determined in a further step 140. These possibly determined data are likewise supplied to the measurement data set 150, wherein a flag that characterizes the measurement data set as "transparent" can additionally be added if necessary.

The steps 110 to 140 of the first method section 100 can be performed in an FPGA, for example.

The measurement data set 150 is subsequently processed further within the framework of the second method section 200. This method section 200 provides at least three test steps 210, 220, 230, wherein a respective test condition is checked or can be checked in each test step. The second method section 200 can be carried out in a signal processor, for example.

A check is made in a first test step 210 whether the number of reception light pulses is equal to 1. If the first test condition checked in the first test step 210 is TRUE, a jump is made to a step 240.

In a step 240, the determination of the distance takes place on the basis of the time of flight determined for the first reception light pulse.

If the first test condition checked in the first test step 210 is FALSE, a jump is made to the second test step 220.

In the second test step 220, a check is made in accordance with a second test condition whether a comparison object, whose associated reception light pulse has substantially the same time of flight as the first reception light pulse, was detected for at least one adjacent angle of rotation. In other words, a check is made in the second test step whether an edge impact is present. If the second test condition is TRUE, a jump is made to the step 240.

If the second test condition is FALSE, a jump is made to the third step 230.

In the third test step 230, a check is made in accordance with a third test condition whether a reflector, whose associated reception light pulse has substantially the same time of flight as the second reception light pulse, was detected for at least one adjacent angle of rotation. In other words, a check is made here whether a reflector, in particular a retroreflector, is present in the background.

If the third check condition is TRUE, a jump is made to the step 240.

If the third check condition is FALSE, a jump is made to the step 250.

In the step 250, the distance is determined on the basis of the time of flight determined for the second reception light pulse.

The steps 240 and 250 can be followed by further method steps, for example the determination of a respective position of the detected object on the basis of the angle of rotation and of the distance determined in accordance with the step 240 or 250.

Subsequent to this, even further (test) steps can be carried out, for example, whether the determined position is located within a predetermined protected field.

In accordance with a modification, not shown, the order of the test conditions checked in the second test step 220 and in the third test step 230 can also be swapped, i.e. a check is made in the second test step 220 whether a reflector is present in the background and a check is made in the third test step 230 whether an edge impact is present.

The check of the first test condition in the test step 210 can not only take place by an analysis of the measurement data set 150, in which the presence of a second reception light pulse is checked (possibly for the second time) and its associated distance is possibly determined, but alternatively or additionally also by an evaluation of the measurement data set 150 for the presence of the transparency flag.

The FPGA and the signal processor can be integrated in a control unit or in an evaluation and control unit of the distance-measuring monitoring sensor 10 (FIGS. 2 to 4).

In accordance with a modification not shown, the test steps 210 to 230 can always be carried out independently of the output of a previous test step, wherein the corresponding truth values of these checks can, for example, be stored in the form of respective flags in the measurement data set 150. An evaluation of the flags can then be carried out subsequently to the performance of the three test steps 210 to 230, wherein a decision whether the step 240 or step 250 is carried out is then made on the basis of this evaluation. The step 250 is only carried out if all three truth values are FALSE; however, if one or more of the truth values are TRUE, the step 240 is always carried out.

REFERENCE NUMERAL LIST

10 monitoring sensor
11 protected field
12, 12*a*, 12*b* object
14 reflector
16 background object
17, 17 occluding object
18, 18*a* 18 transmitted light pulse
20 scattered light
22 first reception light pulse
24 second reception light pulse
30 raw detected signal
32 detected signal
100 first method section
200 second method section
110, 120, 130, 140 steps of the first method section
150 measurement data set
210, 220, 230 test steps of the second method section
240, 250 distance determination steps of the second method section
D [m] distance in meters

The invention claimed is:

1. A method of operating a distance-measuring monitoring sensor for the detection and position determination of objects in an at least two-dimensional protected field, wherein the monitoring sensor comprises at least one light transmitter; at least one light receiver; and a deflection unit, said method comprising the steps of:

a) transmitting light pulses with the at least one light transmitter into the at least two-dimensional protected field, wherein the at least two-dimensional protected field is periodically scanned with the transmitted light pulses by the deflection unit;

b) receiving reception light pulses reflected or remitted by at least one object possibly present in the protected field;

c) detecting a respective detected signal that comprises a respective time curve of a reception signal received by the light receiver for a respective angle of rotation;

d) determining the number of reception light pulses that are included in a respective detected signal, with that reception light pulse which has the shortest time of flight representing a first reception light pulse and a possibly present reception light pulse which has a longer time of flight representing a second reception light pulse; and e) generating a detection signal for a respective detected object, with the detection signal comprising information on the determined position of the object, wherein the respective position of the at least one object is determined from an angle of rotation of the deflection unit and from the distance determined in dependence on the time of flight of a respective reception light pulse, wherein the method comprises at least the three following test conditions and the determination of the position and the determination of the distance take place in dependence on a respective logical truth value of at least one of the test conditions, wherein a check is made in accordance with a first test condition whether the number of reception light pulses in a respective reception signal is equal to 1;

a check is made in accordance with a second test condition whether a comparison object, whose associated reception light pulse has the same or at least substantially the same time of flight as the first reception light pulse, was detected for at least one adjacent angle of rotation; and a check is made in accordance with a third test condition whether a reflector, whose associated reception light pulse has the same or at least substantially the same time of flight as the second reception light pulse, was detected for at least one adjacent angle of rotation, wherein the first test condition is checked in a first test step, either the second or third test condition is checked in a possibly performed second test step, and the third or second test condition that has not been checked up to then is checked in a possibly performed third test step, and wherein the determination of the distance takes place on the basis of the time of flight determined for the second reception light pulse if the truth value of the first, second and third test conditions is FALSE in each case and otherwise takes place on the basis of the time of flight determined for the first reception light pulse.

2. The method in accordance with claim 1, wherein further ones of the three test conditions are no longer checked if the truth value of a previously checked test condition is TRUE.

3. The method in accordance with claim 1,
wherein the first, second and third test steps are first carried out and the truth values of the associated test conditions are evaluated in a subsequent evaluation step, with a determination being made on the basis of said conditions for the truth values whether the distance is to be determined on the basis of the time of flight of the first or second reception light pulse.

4. The method in accordance with claim 1,
wherein step c) comprises a quantization of the detected signal.

5. The method in accordance with claim 1,
wherein one of an alarm signal and a shutdown signal is output in a step f) following step e) if at least one respective detection signal satisfies at least one predefined alarm condition.

6. The method in accordance with claim 1,
wherein the determination of the number of reception light pulses in step d) comprises a determination being made for one or more local maxima present in the detected signal whether one or more criteria are satisfied that are necessary for an identification as a reception light pulse, with the criteria being selected from a group that comprises a predefined height, width and/or pulse shape.

7. The method in accordance with claim 1,
wherein the check of the third test condition whether a reflector was detected for an adjacent angle of rotation comprises the intensity of a reception light pulse associated with the at least one adjacent angle of rotation being evaluated and preferably being compared with a fixedly or dynamically predefined intensity threshold value.

8. The method in accordance with claim 1,
wherein the monitoring sensor is a laser scanner that is adapted to monitor one or more scanning surfaces.

9. A distance-measuring monitoring sensor for the detection and position determination of objects in an at least two-dimensional protected field, wherein the monitoring sensor comprises:
 at least one light transmitter;
 at least one light receiver;
 a deflection unit; and
 a control unit,
 wherein the at least one light transmitter transmits light pulses into the at least two-dimensional protected field,
 wherein the at least one light receiver receives light pulses as reception light pulses that are reflected or remitted by at least one object possibly present in the protected field; and
 wherein said deflection unit periodically scans at least the protected field with the transmitted light pulses,
 wherein the respective position of the at least one object is determined from an angle of rotation of the deflection unit and from the distance determined in dependence on the time of flight of a respective reception light pulse, and
 wherein the control unit is configured to perform the following steps:
 a) detecting a respective detected signal that comprises a respective time curve of a reception signal received by the light receiver for a respective angle of rotation;
 b) determining the number of reception light pulses that are included in a respective detected signal, with that reception light pulse which has the shortest time of flight representing a first reception light pulse and a possibly present reception light pulse which has a longer time of flight representing a second reception light pulse; and
 c) generating a detection signal for a respective detected object, with the detection signal comprising information on the determined position of the object, wherein the method comprises at least the three following test conditions and the determination of the position and the determination of the distance take place in dependence on a respective logical truth value of at least one of the test conditions, wherein
  a check is made in accordance with a first test condition whether the number of reception light pulses in a respective reception signal is equal to 1;
  a check is made in accordance with a second test condition whether a comparison object, whose associated reception light pulse has the same or at least substantially the same time of flight as the first reception light pulse, was detected for at least one adjacent angle of rotation; and
  a check is made in accordance with a third test condition whether a reflector, whose associated reception light pulse has the same or at least substantially the same time of flight as the second reception light pulse, was detected for at least one adjacent angle of rotation, wherein the first test condition is checked in a first test step, either the second or third test condition is checked in a possibly performed second test step, and the third or second test condition that has not been checked up to then is checked in a possibly performed third test step, and
 wherein the determination of the distance takes place on the basis of the time of flight determined for the second reception light pulse if the truth value of the first, second and third test conditions is FALSE in each case and otherwise takes place on the basis of the time of flight determined for the first reception light pulse.

* * * * *